(12) United States Patent
DeLong (10) Patent No.: US 7,396,207 B2
(45) Date of Patent: Jul. 8, 2008

(54) WIND TURBINE

(76) Inventor: Dee James DeLong, 30 Cameron Glen Dr., Atlanta, GA (US) 30328-4745

( * ) Notice: Subject to any disclaimer, the term of this patent is extended or adjusted under 35 U.S.C. 154(b) by 177 days.

(21) Appl. No.: 10/941,180

(22) Filed: Sep. 14, 2004

(65) Prior Publication Data

US 2006/0056972 A1 Mar. 16, 2006

(51) Int. Cl.
*F03B 3/14* (2006.01)
(52) U.S. Cl. .................. 416/87; 416/132 A; 416/132 B; 416/142; 416/240; 415/4.3
(58) Field of Classification Search .................. 415/4.1, 415/4.3, 4.5; 416/87, 88, 143, 132 B, 132 A, 416/240; 114/104, 106, 107
See application file for complete search history.

(56) References Cited

U.S. PATENT DOCUMENTS

| 243,169 | A | 6/1881 | Sprague |
|---|---|---|---|
| 1,713,866 | A | 5/1929 | D'Asseler |
| 3,285,215 | A | 11/1966 | Potter |
| 3,835,804 | A | 9/1974 | Jackson |
| 4,101,244 | A | 7/1978 | Grotberg |
| 4,191,507 | A | 3/1980 | DeBerg |
| 4,208,168 | A | 6/1980 | Chen et al. |
| 4,316,361 | A | 2/1982 | Hoar |
| 4,342,539 | A | 8/1982 | Potter |
| 4,417,853 | A | 11/1983 | Cook |
| 4,435,125 | A | 3/1984 | Cook |
| 4,486,143 | A | 12/1984 | McVey |
| 4,545,729 | A | 10/1985 | Storm |
| 4,547,125 | A | 10/1985 | McMahon, II |
| 4,582,013 | A | 4/1986 | Holland, Jr. |
| 4,619,585 | A | 10/1986 | Storm |

(Continued)

FOREIGN PATENT DOCUMENTS

DE 26 42 570 A1 3/1978

(Continued)

OTHER PUBLICATIONS

International Search Report from PCT/US2005/029477, dated Apr. 21, 2006.

(Continued)

*Primary Examiner*—Edward Look
*Assistant Examiner*—Dwayne J White
(74) *Attorney, Agent, or Firm*—Alston & Bird LLP (57) ABSTRACT

A wind turbine comprising: (1) a support portion; (2) a hub that is mounted to rotate adjacent the support portion; and (3) at least one turbine blade mounted adjacent the hub and that comprises both a rotor and a sail that is mounted adjacent the rotor. The rotor may be in the shape of an airfoil, and the sail is preferably mounted to be selectively extended and retracted adjacent the rotor. The wind turbine may include a boom that extends adjacent the rotor. In one embodiment, the sail is mounted so that the sail is stored adjacent within, or adjacent a rear surface of, the boom when the sail is in a retracted position. The exterior surface of the boom may be substantially in the shape of an airfoil. In one embodiment, the wind turbine is configured to selectively extend or retract its sails in response to varying weather conditions.

23 Claims, 10 Drawing Sheets

U.S. PATENT DOCUMENTS

| | | | |
|---|---|---|---|
| 4,729,716 A | | 3/1988 | Schmidt |
| 4,818,180 A | | 4/1989 | Liu |
| 5,171,127 A | | 12/1992 | Feldman et al. |
| 5,183,386 A | | 2/1993 | Feldman et al. |
| 5,454,694 A | | 10/1995 | O'Dell |
| 5,525,037 A | | 6/1996 | Cummings |
| 5,531,567 A | * | 7/1996 | Hulls .......................... 416/87 |
| 5,697,314 A | * | 12/1997 | Clausin ...................... 114/106 |
| 5,823,749 A | | 10/1998 | Green |
| 6,302,044 B1 | | 10/2001 | Baudet |
| 6,352,485 B1 | * | 3/2002 | Philpot et al. ............... 473/564 |
| 2002/0149134 A1 | * | 10/2002 | Hemphill et al. ............ 264/255 |
| 2003/0059306 A1 | | 3/2003 | Miller |
| 2005/0164023 A1 | * | 7/2005 | Davis et al. ................. 428/480 |

FOREIGN PATENT DOCUMENTS

| | | |
|---|---|---|
| DE | 31 13 211 A1 | 10/1982 |
| EP | 0 016 602 A1 | 10/1980 |
| EP | 0 249 427 A1 | 12/1987 |

OTHER PUBLICATIONS

International Search Report from International Application No. PCT/US2005/029477, dated Feb. 3, 2006.

* cited by examiner

WIND TURBINE

BACKGROUND OF THE INVENTION

Wind turbines have been used for decades to convert wind energy to useful mechanical or electrical energy. The current focus in the wind turbine industry is on producing very large wind turbines that are equipped with standard rotors (such as GE's 3.6S Offshore Wind Turbine) and using those wind turbines in high-wind zones. The goal of this approach is to obtain the largest energy output possible from each wind turbine. Drawbacks associated with this approach include the fact that the approach requires a large capital investment per wind turbine, and also that it requires the various wind turbines to be used in high-wind zones. Accordingly, there is a need for improved wind turbines that, for example, are less expensive to produce and that are suitable for use in low-wind zones.

BRIEF SUMMARY OF THE INVENTION

A wind turbine according to one embodiment of the invention comprises: (1) a support portion; (2) a hub that is mounted to rotate adjacent the support portion; and (3) at least one turbine blade that is mounted adjacent the hub and that comprises both a rotor and a sail that is mounted adjacent the rotor. In this embodiment of the invention, the rotor is substantially in the shape of an airfoil, and the sail is mounted to be selectively extended and retracted adjacent the rotor. In a particular embodiment, the wind turbine comprises a furling mechanism (e.g., a roller furling mechanism) that is adapted for selectively extending and retracting the sail adjacent the rotor.

In one embodiment of the invention, the sail is mounted so that at least a portion of the sail (and preferably substantially the entire sail) is stored adjacent a rear surface of the rotor when the sail is in a retracted position. In another embodiment, the sail is mounted so that at least a portion of the sail (and preferably substantially the entire sail) is stored within the rotor when the sail is in a retracted position.

In a particular embodiment of the invention, the wind turbine comprises a boom that extends (e.g., in a substantially fixed position) adjacent the rotor. In this embodiment, the sail is mounted so that at least a portion of the sail (and preferably substantially the entire sail) extends between the rotor and the boom when the sail is in an extended position. In one embodiment, the sail is mounted so that at least a portion of the sail (and preferably substantially the entire sail) is stored within, or adjacent a rear surface of, the boom when the sail is in a retracted position. In a particular embodiment of the invention, the exterior surface of the boom is substantially in the shape of an airfoil.

In one embodiment of the invention, the wind turbine includes a wind sensing mechanism that is adapted to determine a wind speed adjacent the wind turbine, and a control system that is adapted to reposition the wind turbine's sails (e.g., extend or retract the sails) in response to the determined wind speed. For example, the control system may retract the sail in response to detecting high wind speeds adjacent the wind turbine. Similarly, the control system may extend the sail in response to detecting low wind speeds adjacent the wind turbine.

A method of constructing a wind turbine according to one embodiment of the invention comprises the steps of: (1) transporting raw materials needed to construct at least one turbine blade to, or adjacent, a turbine use site at which the wind turbine will be installed (e.g., substantially fixedly installed) for use; (2) constructing, from the raw materials, at least a portion of the at least one turbine blade at, or adjacent, the turbine use site; (3) providing a support portion and a hub; (4) mounting the hub so that the hub may rotate adjacent the support portion; and (5) mounting the at least one turbine blade adjacent the hub so that the at least one turbine blade serves to rotate the hub when the at least one turbine blade is exposed to wind. In various embodiments of the invention, the above-referenced constructing step may include using pultrusion, resin infusion, filament winding, or thermoforming techniques to form at least a part of at least one of the wind turbine's turbine blades.

BRIEF DESCRIPTION OF THE DRAWINGS

Having thus described various embodiments of the invention in general terms, reference will now be made to the accompanying drawings, which are not necessarily drawn to scale, and wherein:

In FIG. 5F, the sail is shown extending out of the outer shell. In FIG. 5G, the sail is in a retracted orientation, and the sail is stored within the rotor or boom's outer shell.

DETAILED DESCRIPTION OF THE INVENTION

The present invention now will be described more fully with reference to the accompanying drawings, in which some, but not all embodiments of the invention are shown. As will be understood by one skilled in the relevant field, this invention may be embodied in many different forms and should not be construed as limited to the embodiments set forth herein. Rather, these embodiments are provided so that this disclosure will satisfy applicable legal requirements. Like numbers refer to like elements throughout.

I. Overview of Wind Turbine Structure

Figure 1:
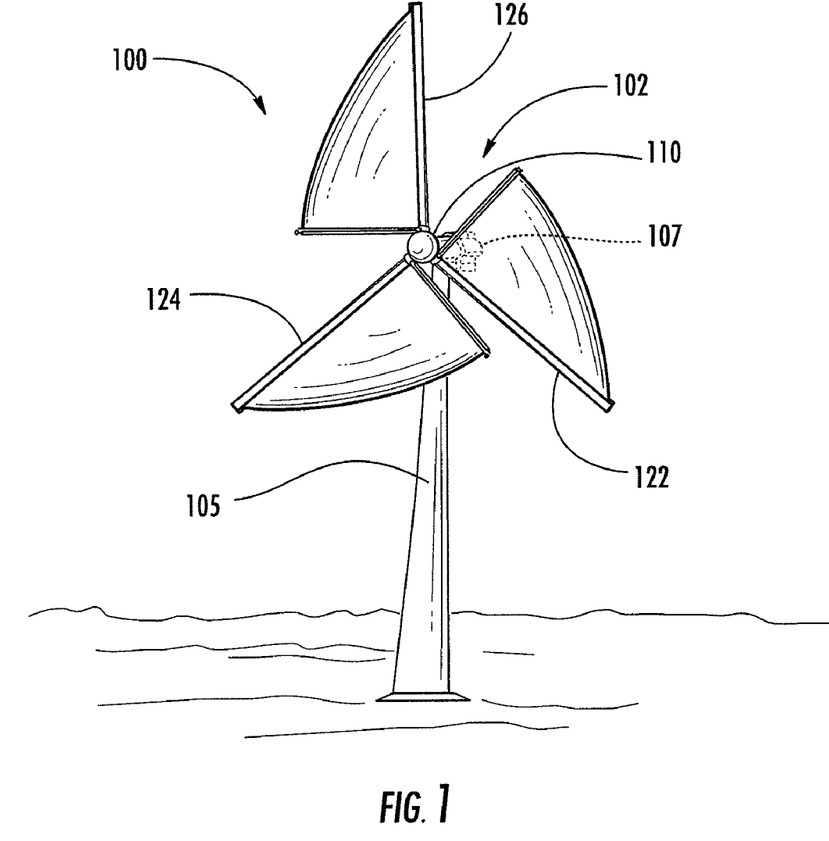
FIG. 1 is a perspective view of a wind turbine according to a particular embodiment of the invention.

FIG. 1 depicts a front view of a wind turbine 100 according to one embodiment of the invention. As may be understood from this figure, in this embodiment, the wind turbine 100 comprises a support portion 105, a hub 110 that is mounted to rotate adjacent the support portion 105, and three turbine blades 122, 124, 126 that extend radially outwardly from the hub 110. As may be understood from FIG. 1, in one embodiment of the invention, the turbine blades 122, 124, 126 are positioned so that they are spaced apart evenly about the center of the hub 110.

In a particular embodiment of the invention, the wind turbine 100 further includes a generator 107 that is attached to the hub 110 via a drive shaft in a manner known in the art. As will be understood by one skilled in the relevant field in light of this disclosure, the generator 107 is used to convert the rotational energy of the hub (which is rotated by wind forces acting on the turbine blades 122, 124, 126) into electricity. Because appropriate turbine supports 105, generators 107, and drive shafts are well known in the relevant field, they will not be described in detail in this specification.

In the various embodiments of the invention described herein, the wind turbine's various blades are shown and described as being positioned so that their front surfaces face away from the wind turbine's drive shaft and support portion. However, in alternative embodiments of the invention, the wind turbine's various blades may be positioned so that their front surfaces face toward the wind turbine's drive shaft and support portion. In such an embodiment, the wind turbine is preferably positioned so that wind passes the support portion and drive shaft before contacting the wind turbine's blades.

Also, although the wind turbine's various blades are described in various embodiments herein as being attached in a substantially fixed position adjacent the wind turbine's hub, in alternative embodiments of the invention, the wind turbine's blades may be adapted to be moved (e.g., via an appropriate control system) relative to the wind turbine's hub. For example, the wind turbine may be adapted to rotate its various blades between: (1) a first position in which the blades are not substantially parallel to high winds passing adjacent the wind turbine; and (2) a second position in which the blades are substantially parallel to high winds passing adjacent the wind turbine. This can help to prevent the wind turbine from being damaged by the high winds.

The structure of the wind turbine's turbine blades 122, 124, 126 and hub 110 will now be described in greater detail.

Structure of the Turbine Blades

Figure 2A:
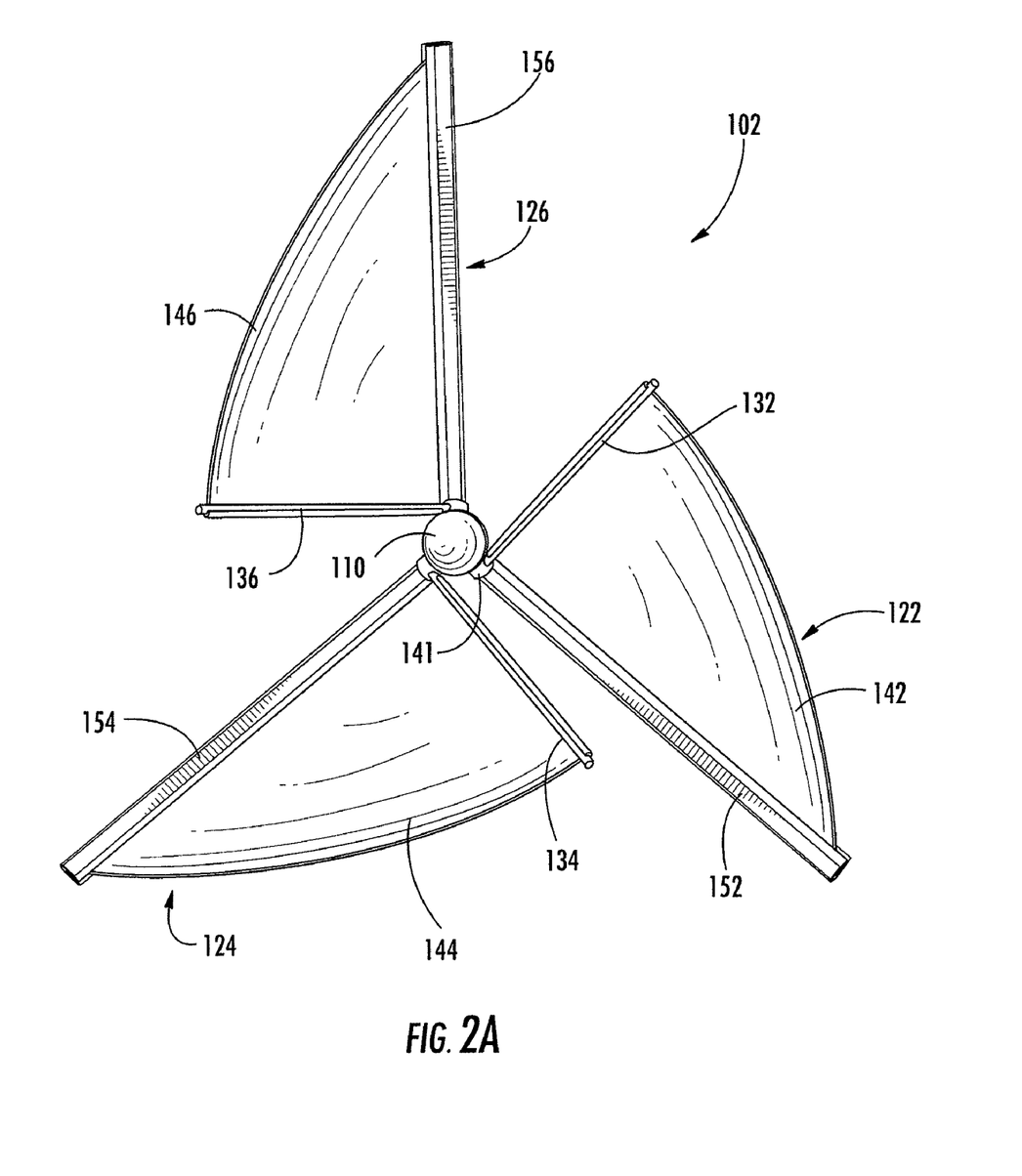
FIG. 2A is a front view of three turbine blades and a hub according to a particular embodiment of the invention. This figure shows the turbine blades' sails in a substantially fully extended position.
Figure 2B:
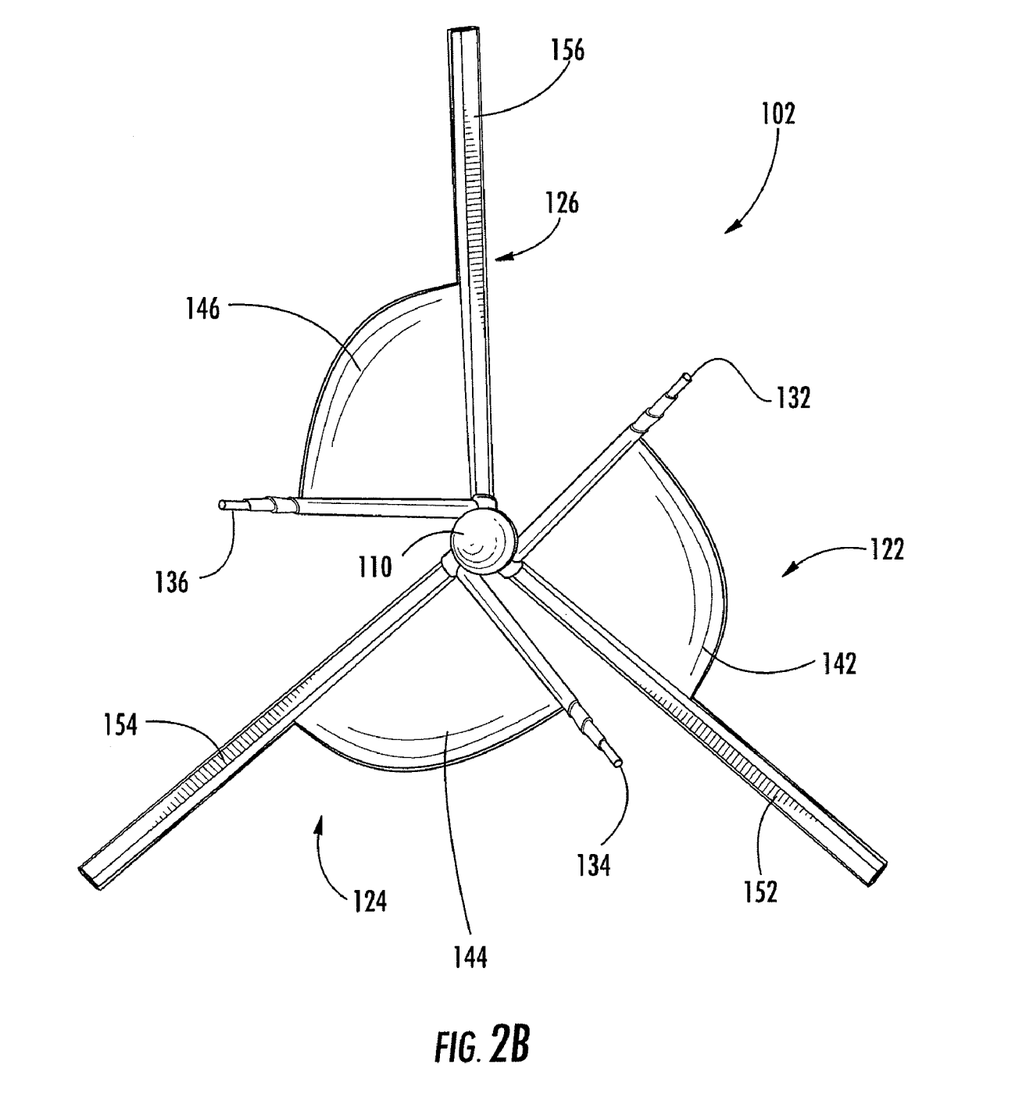
FIG. 2B is a front view of three turbine blades and a hub according to a particular embodiment of the invention. This figure shows the turbine blades' sails in a partially extended position.
Figure 2C:
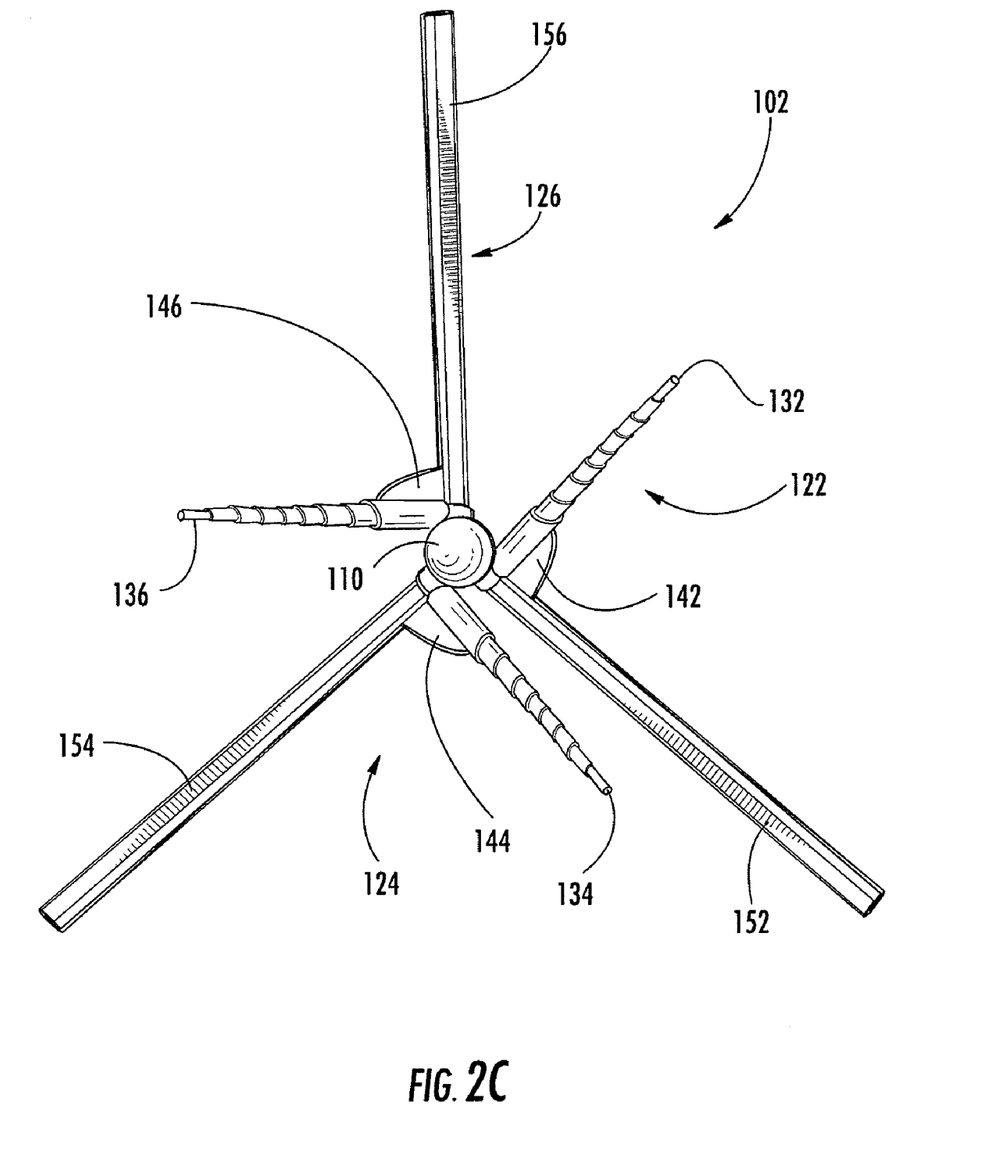
FIG. 2C is a front view of three turbine blades and a hub according to a particular embodiment of the invention. This figure shows the various turbine blades' sails in a substantially fully retracted position.

FIGS. 2A-2C depict a detailed view of three turbine blades 122, 124, 126 according to a particular embodiment of the invention. The below description will focus on the rightmost turbine blade 122 shown in these figures. However, in this embodiment, the three turbine blades 122, 124, 126 shown in FIGS. 2A-2C have essentially the same structure.

As may be understood from FIG. 2A, the rightmost turbine blade 122 comprises a rotor 152 and a boom 132 that extends outwardly adjacent the rotor 152. In one embodiment of the invention, both the rotor 152 and the boom 132 are elongate and the boom 132 is positioned to form an angle of about 90 degrees with the rotor 152. As described in greater detail below, in this embodiment, the boom 132 is connected to the rotor 152 by a substantially circular attachment member 141 that surrounds an end portion of the boom 132.

In one embodiment of the invention, the turbine blade 122 further comprises a sail 142 that is configured to be selectively moved between an extended position (shown in FIG. 2A) and a retracted position (shown in FIG. 2C). FIG. 2B shows the sail 142 in a partially extended position that is intermediate the fully extended and fully retracted positions. It should be understood that, in certain embodiments of the invention, a particular sail may be shorter than its corresponding rotor. Accordingly, in certain embodiments, the sail may not extend along the entire length of the rotor when the sail is fully extended.

In one embodiment of the invention, one or more of the wind turbine's sails are comprised of laminated fiber material that, for example, may include high strength fiber reinforcements that are disposed between two or more sheets of laminate material. Exemplary appropriate sails include any of the composite sails currently manufactured by Cuben Fiber Corporation. However, the sails may alternatively be made of any other appropriate sail material (such as other materials used in sailboat sails).

In a particular embodiment, each of the wind turbine's sails 142, 144, 146 is configured to be stored adjacent a respective boom in a rolled-up configuration when the sails 142, 144, 146 are in a retracted position. For example, in one such embodiment, each of the booms 132, 134, 136 comprises a roller furling mechanism, which may have the same general structural configuration as the roller furling mechanisms that are currently used to manage sails in sailboats. In this embodiment of the invention, each of the sails 142, 144, 146 is configured to roll up substantially entirely onto a corresponding roller furling mechanism until the sails 142, 144, 146 are in a substantially fully retracted position (see FIG. 2C). Similarly, the sails 142, 144, 146 are configured to roll substantially entirely off of the roller furling mechanism until the sails 142, 144, 146 are in a substantially fully extended position (see FIG. 2A).

Figure 3:
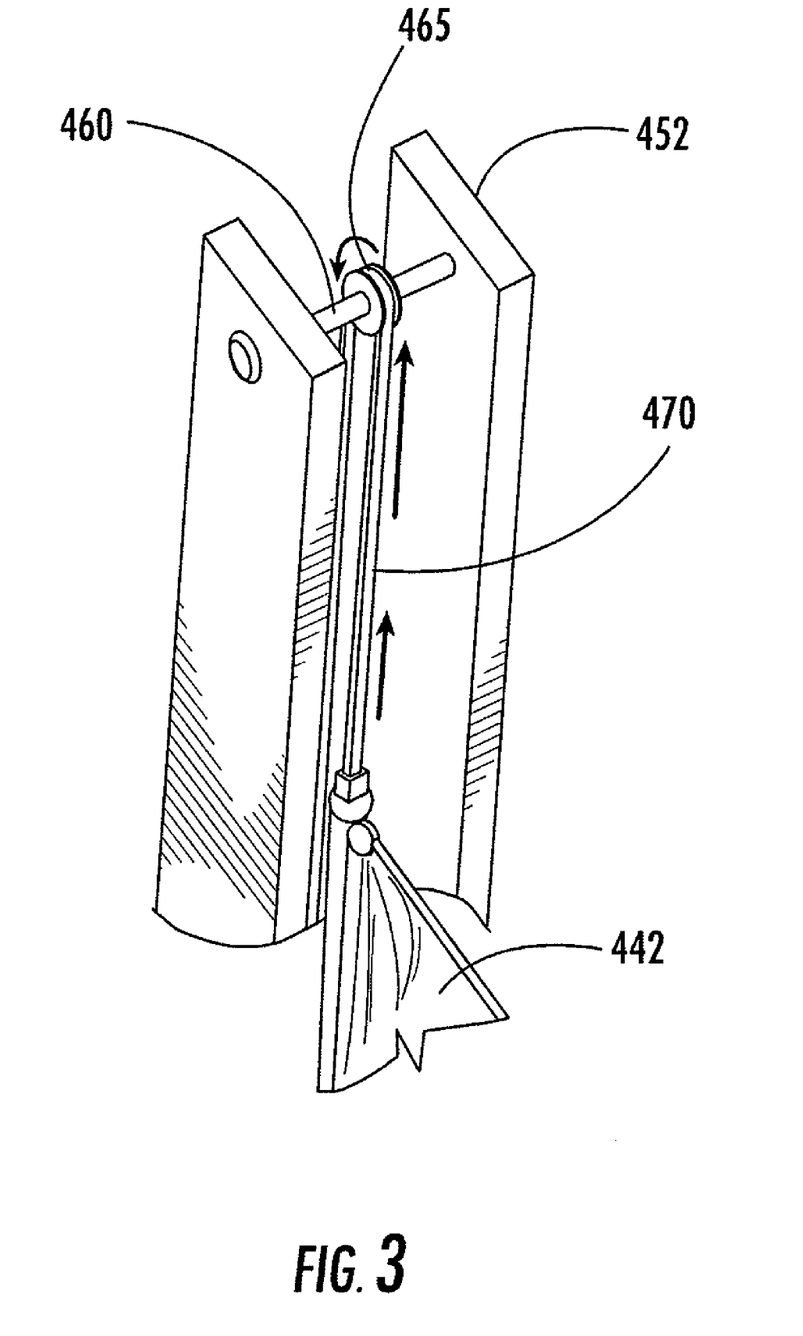
FIG. 3 is a perspective view of the outer end of a rotor according to one embodiment of the invention. This figure shows how the sail may be moved relative to the rotor via a sail hoisting cable.

In one embodiment of the invention, the wind turbine's sails 142, 144, 146 are substantially triangular in shape and comprise a base edge, a side edge, and a hypotenuse edge. As shown in FIGS. 2A and 3, in a particular embodiment, each sail's base edge is attached to the roller furling mechanism and the tip of each sail (e.g., the sail 442 that is shown in FIG. 3) is attached to a hoisting cable 470 that is disposed adjacent the rotor 152, 452. It should be understood that the sails may be in any appropriate shape or form and, as will be understood by one skilled in the relevant field, may have one or more slightly rounded edges.

As shown in FIG. 3, in one embodiment, the hoisting cable 470 is disposed within a recess defined by the rotor 152, 452. This hoisting cable 470 may be mounted, for example, to extend between and around two pulleys (e.g., a first pulley 465 that is disposed adjacent the rotor's outer edge and a second pulley (not shown) that is disposed adjacent the hub 110). In one embodiment, the hosting cable 470 is stretched tightly around the exterior edges of the first and second pulleys so that when the first pulley 465 is rotated in a particular direction, the hoisting cable 470 moves around the exterior portions of the first and second pulleys in the first pulley's direction of rotation. For example, as shown in FIG. 3, if the first pulley 465 is rotated in a counterclockwise direction, the hoisting cable 470 will move in a generally clockwise direction about the exterior of the first and second pulleys.

In one embodiment of the invention, the tip of the sail 442 is attached to the hoisting cable 470 between the first pulley 465 and the second pulley. Accordingly, rotating the first and second pulleys in a first direction causes the cable (and thus the tip of the sail) to move toward the first pulley 465. This causes the sail 442 to unfurl from the roller furling mechanism and to move toward the fully extended position. Similarly, rotating the pulleys in a second direction (e.g., opposite the first direction) causes the hoisting cable 470 (and thus the tip of the sail 442) to move toward the second pulley. This causes the sail 442 to furl onto the roller furling mechanism, and to move toward the fully retracted position. Thus, the pulley/cable assembly may be used move the sail 442 between the fully retracted and fully extended positions. As will be understood by one skilled in the art, in one embodiment of the invention, the roller furling device may include a motorized or spring-activated mechanism for facilitating winding the sail 442 onto the rotor or boom.

In one embodiment of the invention, at least one of the first and second pulleys is attached to a drive mechanism (e.g., a servo motor) so that the drive mechanism may mechanically rotate the pulley to which it is attached. In this embodiment, the drive mechanism is preferably controlled, in a manner known in the art, by a central computer associated with the wind turbine. This allows the central computer to control the furling and unfurling of the sail 442. In one embodiment of the invention, the second pulley is motorized and the first pulley 465 is an idler pulley. In another embodiment of the invention, the first pulley 465 is motorized and the second pulley is an idler pulley. In a further embodiment of the invention, both the first and second pulleys are motorized. Also, in a particular embodiment of the invention, a windup rod inside or adjacent the rotor or boom may also be motorized to facilitate furling and unfurling the sail.

In a particular embodiment of the invention, the hoisting cable 470 and first and second pulleys are configured so that the sail's side edge may move within a recess defined by the rotor 452 as the sail 442 moves between the extended and retracted positions. However, in other embodiments of the invention, the sail's side edge may be configured to move outside of any recess defined by the rotor 452.

Figure 4:
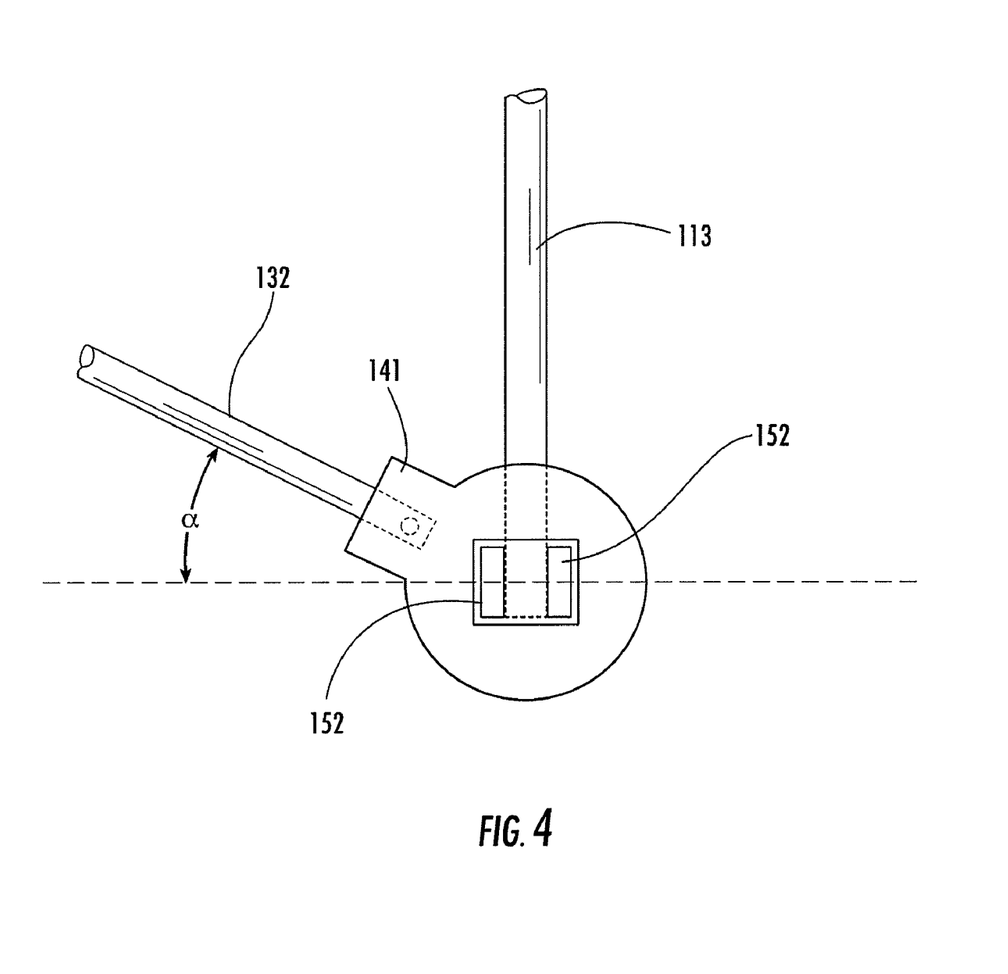
FIG. 4 is top view of a turbine blade and drive shaft according to a particular embodiment of the invention.

FIG. 4 depicts one manner in which a boom 132 may be attached adjacent the rotor 152 (an end view of which is shown in FIG. 4). In this embodiment, the rotor 152 defines a rotor-body plane (shown in dashed lines in FIG. 4), and the boom 132 is mounted so that it forms an angle (α) with the rotor-body plane. In a particular embodiment of the invention, this angle (α) is between about 0 and 45 degrees.

In one embodiment of the invention, a substantially circular attachment member 141 is used to attach the boom 132 adjacent the rotor 152. As shown in FIG. 4, in one embodiment, this attachment member 141 substantially surrounds the base of the rotor 152 and fixedly receives the inner end of the boom 132. In a particular embodiment of the invention, the attachment member 141 is comprised of a fiber-reinforced composite material. However, the attachment member 141 may be made of any other suitable material. In one embodiment of the invention, the inner end of the boom 132 is attached directly to the wind turbine's hub.

Returning to the structure of the wind turbine's various rotors 152, 154, 156, in one embodiment of the invention, the rotors 152, 154, 156 are substantially in the shape of an airfoil so that even when the wind turbine's sails 142, 144, 146 are fully furled, the rotors 152, 154, 156 may act effectively as wind turbine rotors. Similarly, the wind turbine's booms 132, 134, 136 may also be substantially in the shape of an airfoil so that when the wind turbine's sails 142, 144, 146 are fully furled, the booms 132, 134, 136 may also act effectively as wind turbine rotors.

Figure 5A:
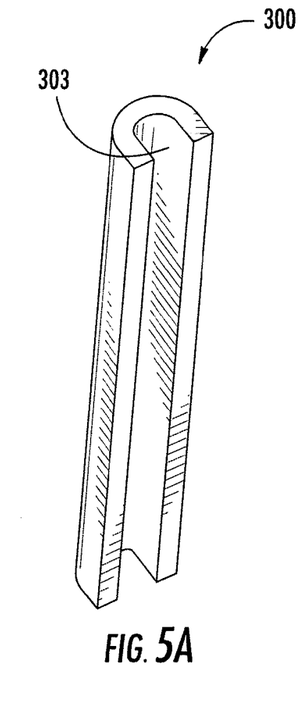
FIG. 5A is a perspective view of a representative length of a rotor or boom according to one embodiment of the invention. In this embodiment, the rotor or boom has a substantially U-shaped cross section.
Figure 5B:
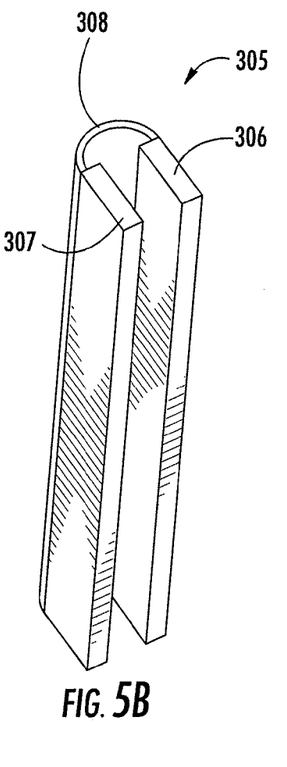
FIG. 5B is a perspective view of a representative length of a rotor or boom according to one embodiment of the invention. In this embodiment, the rotor or boom has a substantially U-shaped cross section that is formed by two substantially parallel plates and a substantially C-shaped shell.
Figure 5C:
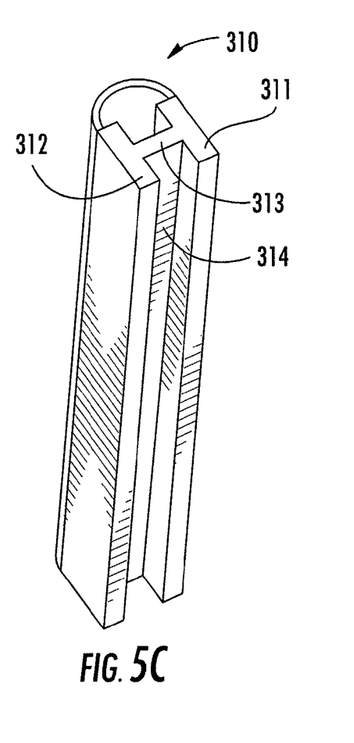
FIG. 5C is a perspective view of a representative length of a rotor or boom according to one embodiment of the invention. In this embodiment, the base portion of the rotor or boom has a substantially H-shaped cross section. The rotor or boom further comprises a C-shaped shell that is attached adjacent one end of the substantially H-shaped cross section.

FIGS. 5A-5C depict the structure of various rotors according to several different embodiments of the invention. For example, FIG. 5A shows a rotor 300 having a substantially U-shaped cross section. In this embodiment of the invention, the rotor 300 defines a recess 303 in which the rotor's cable/pulley assembly may be disposed.

FIG. 5B shows a rotor 305 comprising two offset, parallel plates 306, 307. The rotor 305 also comprises an arcuate shell portion 308 that extends between corresponding side edges of the parallel plates 306, 307. This serves to provide the rotor 305 with an aerodynamic shape. In this embodiment, the two parallel plates and the arcuate shell portion define a recess in which the rotor's cable/pulley assembly may be disposed.

The rotor 310 shown in FIG. 5C is similar in structure to the rotor 305 shown in FIG. 5B except that the parallel plates are connected by a substantially planar bridge portion 313 that extends between the two parallel plates 311, 312. Thus, in this embodiment, the cross section of the rotor's primary support portion is substantially H-shaped. In this embodiment of the invention, the parallel plates 311, 312 and bridge portion 313 define a recess 314 in which the rotor's cable/pulley assembly may be disposed.

Figure 5D:
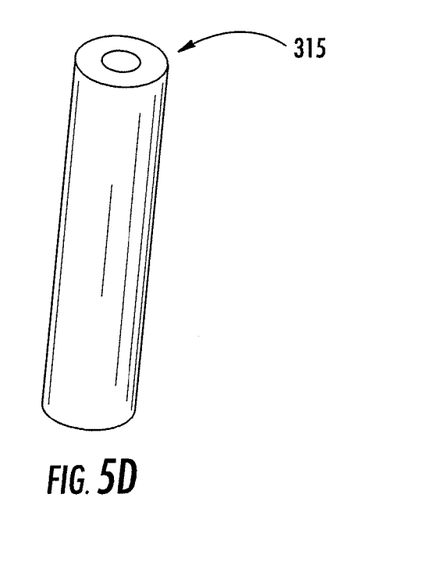
FIG. 5D is a perspective view of a representative length of a rotor or boom according to one embodiment of the invention. In this embodiment, the rotor or boom has a substantially O-shaped cross section.

The rotor 315 shown in FIG. 5D is similar in structure to the rotor 305 shown in FIG. 5A except that the rotor has an O-shaped, rather than a U-shaped, cross-section.

Figure 5E:
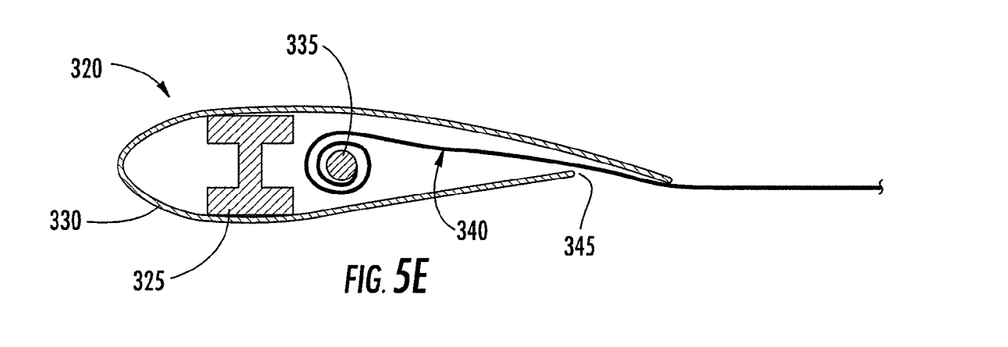
FIG. 5E is a perspective view of a representative length of a rotor or boom according to one embodiment of the invention. In this embodiment, the base portion of the rotor or boom has a substantially H-shaped cross section. The rotor or boom further comprises an outer shell that is substantially in the form of an airfoil, and a roller furling mechanism that is disposed within the outer shell.

The rotor 320 shown in FIG. 5E includes a primary support portion 325 having an H-shaped cross section. The rotor 320 further comprises a substantially airfoil-shaped outer shell 330 that extends substantially around the H-shaped primary support portion 325. In one embodiment, the primary support portion 325 is attached to the interior of the outer shell 330 to so that the primary support portion 325 provides structural support for the outer shell 330 (e.g., when the outer shell 330 is exposed to high winds). In one embodiment of the invention, the primary support portion 325 is disposed adjacent the leading edge of the outer shell 330.

Figure 5F:
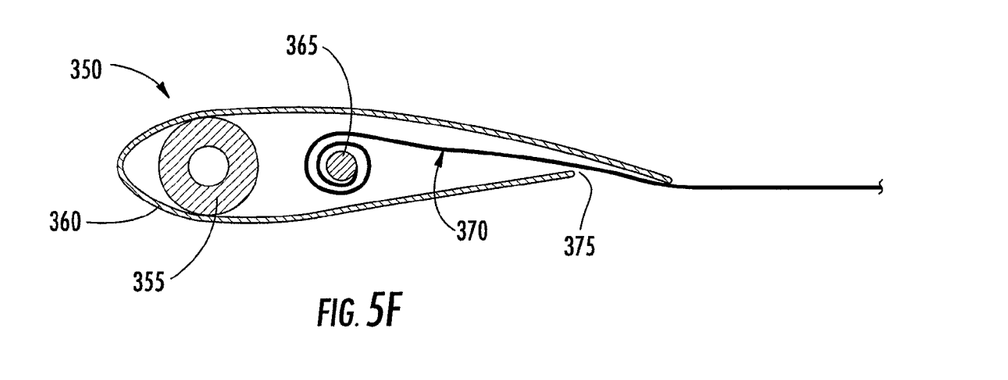
FIGS. 5F and 5G are perspective views of a representative length of a rotor or boom according to one embodiment of the invention. In this embodiment, the base portion of the rotor or boom has a substantially 0-shaped cross-section. The rotor or boom further comprises an outer shell that is substantially in the form of an airfoil, and a roller furling mechanism that is disposed within the outer shell.

A rotor 350 according to another embodiment of the invention is shown in FIG. 5F. This rotor 350 includes a primary support portion 355 having an O-shaped cross section. The rotor 350 further comprises a substantially airfoil-shaped outer shell 360 that extends substantially around the O-shaped primary support portion 355. In one embodiment, the primary support portion 355 is attached to the interior of the outer shell 360 to provide structural support for the outer shell 360 (e.g., when the outer shell 360 is exposed to winds). In one embodiment of the invention, the primary support portion 355 is disposed adjacent the leading edge of the outer shell 360.

As may be understood from FIGS. 5E and 5F, in various embodiments of the invention, the rotor 320, 350 may include a hollow portion that is dimensioned for receiving a roller furling mechanism 335, 365 that is adapted for supporting a sail 340, 370. In various embodiments of the invention, the rotor 320, 350 includes an opening 345, 375 (e.g., an elongate opening) through which a sail 340, 370 may extend. In one embodiment of the invention, the rotor 320, 350 is configured so that when the sail 340, 370 is in a fully retracted position, the sail 340, 370 is disposed substantially entirely within the rotor's outer shell 330, 360. Alternatively, the rotor 320, 350 may be configured so that when the sail 340, 370 is in a fully retracted position, the sail 340, 370 is disposed at least about 50%, 60%, 70%, 80%, or 90% within the rotor's outer shell 330, 360.

Similarly, in various embodiments of the invention, the rotor 320, 350 is configured so that when the sail 340, 370 is in a fully extended position, the sail 340, 370 is disposed substantially entirely outside of the rotor's outer shell 330, 360. Alternatively, the rotor 320, 350 may be configured so that when the sail 340, 370 is in a fully extended position, the sail 340, 370 is disposed at least about 50%, 60%, 70%, 80%, or 90% outside of the rotor's outer shell 330, 360. In one embodiment of the invention, a roller furling mechanism 335, 365 is adapted to move the sail 340, 370 between the fully extended and the fully retracted position.

Figure 5G:
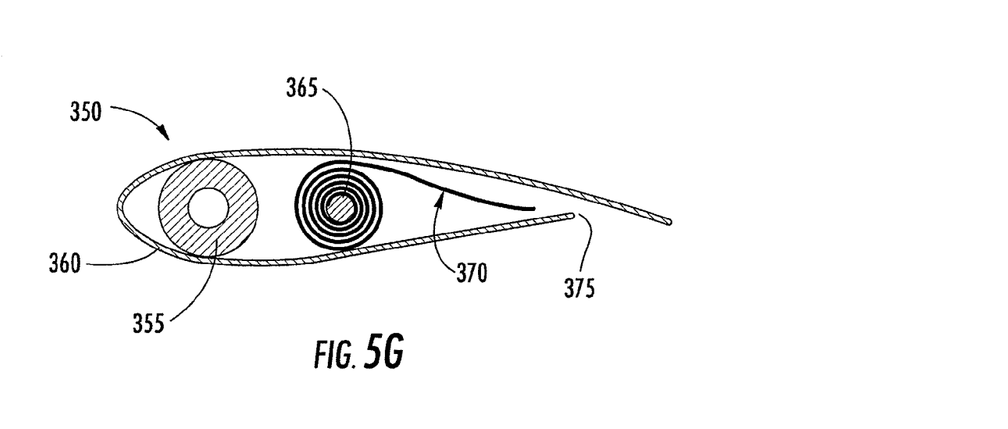
Figure 5H:
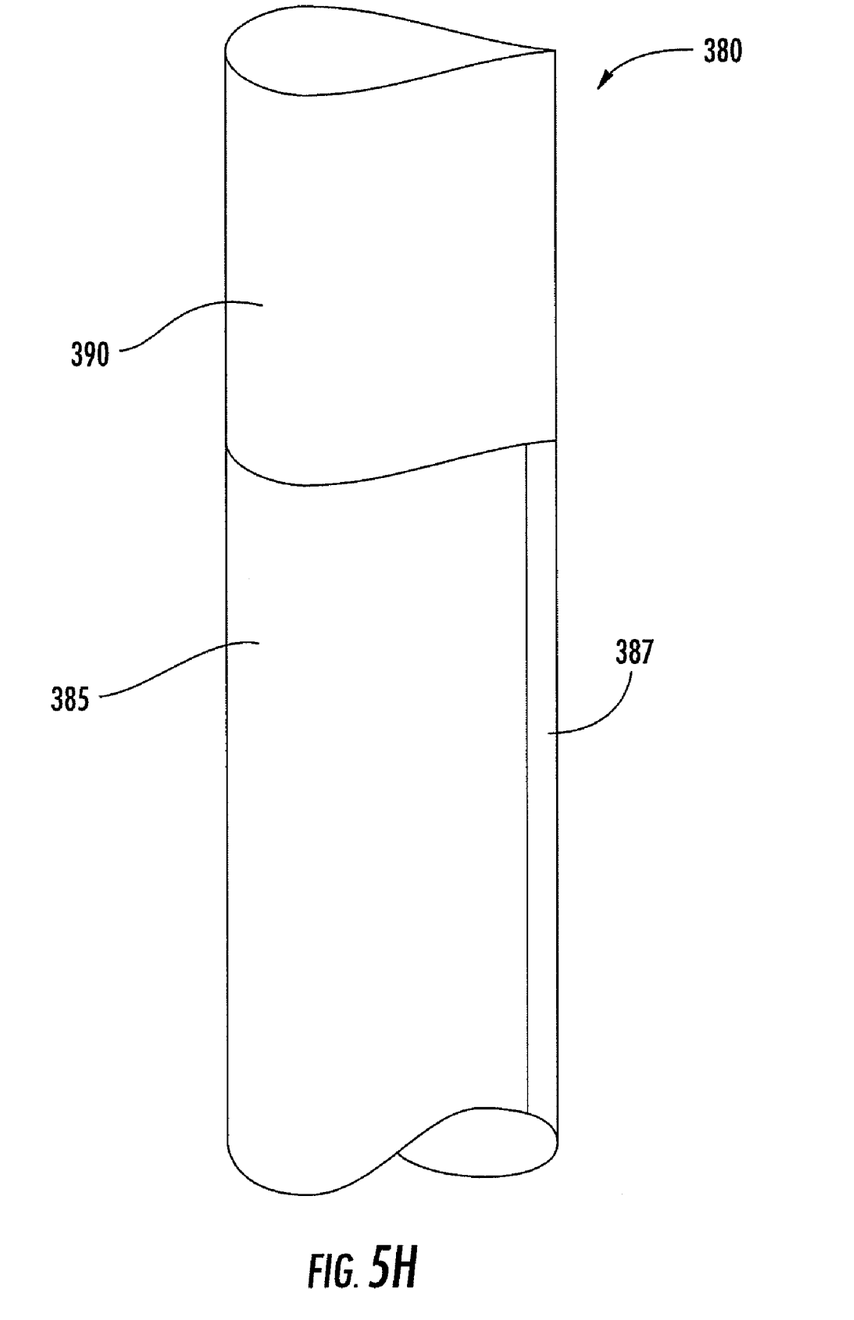
FIG. 5H a perspective view of a hybrid rotor according one embodiment of the invention.

FIG. 5G depicts a hybrid rotor 380 according to one embodiment of the invention. As may be understood from this figure, in one embodiment, the hybrid rotor 380 includes: (1) a sail receiving portion 385 that is configured for managing and storing a sail, and (2) a standard rotor portion 390 (e.g., a rotor portion that does not house a sail). In one embodiment of the invention, the sail receiving portion 385 extends between about 40% and 80% of the length of the hybrid rotor 380, and the standard rotor portion 390 extends between about 20% and 60% of the length of the hybrid rotor 380. In alternative embodiments of the invention, the sail receiving portion 385 extends between about 30% and 90% of the length of the rotor 380, and the standard rotor portion 390 extends between about 10% and 90% of the length of the rotor 380.

In one embodiment of the invention, the sail receiving portion 385 has the cross section shown in FIG. 5E. As may be understood from FIGS. 5E and 5G, in one embodiment, the sail receiving portion 385 includes a hollow portion that is dimensioned for receiving a roller furling mechanism 335 that is adapted for supporting a sail 340. In various embodiments of the invention, the sail receiving portion 385 includes an opening 345, 387 (e.g., an elongate opening) through which a sail 340 may extend. In one embodiment of the invention, the sail receiving portion 385 is configured so that when the sail 340 is in a fully retracted position, the sail 340 is disposed substantially entirely within the sail receiving portion's outer shell. Alternatively, the sail receiving portion 385 may be configured so that when the sail 340 is in a fully retracted position, the sail 340 is disposed at least about 50%, 60%, 70%, 80%, or 90% within the sail receiving portion's 385 outer shell.

Similarly, in various embodiments of the invention, the sail receiving portion 385 is configured so that when the sail 340 is in a fully extended position, the sail 340 is disposed substantially entirely outside of the sail receiving portion's 385 outer shell. Alternatively, the sail receiving portion 385 may be configured so that when the sail 340 is in a fully position, the sail 340 is disposed at least about 50%, 60%, 70%, 80%, or 90% outside of the sail receiving portion's outer shell. In one embodiment of the invention, the roller furling mechanism 335 is adapted to move the sail between the fully extended and the fully retracted position.

In various embodiments of the invention, one or more of the wind turbine's booms 132, 134, 136 may also have a structure shown in FIGS. 5A-5G. In these embodiments of the invention, the roller furling mechanism may be disposed within the structure's recess in order to enhance the aerodynamic qualities of the boom 132, 134, 136. For example, in one embodiment, the boom 132, 134, 136 is substantially in the shape shown in FIG. 5A and the roller furling mechanism is disposed within the recess 303 defined by the boom.

Structure of the Hub

In one embodiment of the invention, the wind turbine's hub is structured to receive the interior ends of the wind turbine's various rotors and to maintain these inner ends in place adjacent the rotor. As noted above, the hub is preferably mounted to rotate adjacent the wind turbine and is attached to a drive shaft in a manner known in the art. As discussed above, this drive shaft is preferably attached to convey the rotational energy of the hub to a generator, which then converts this energy into electricity in a manner known in the art.

Figure 6:
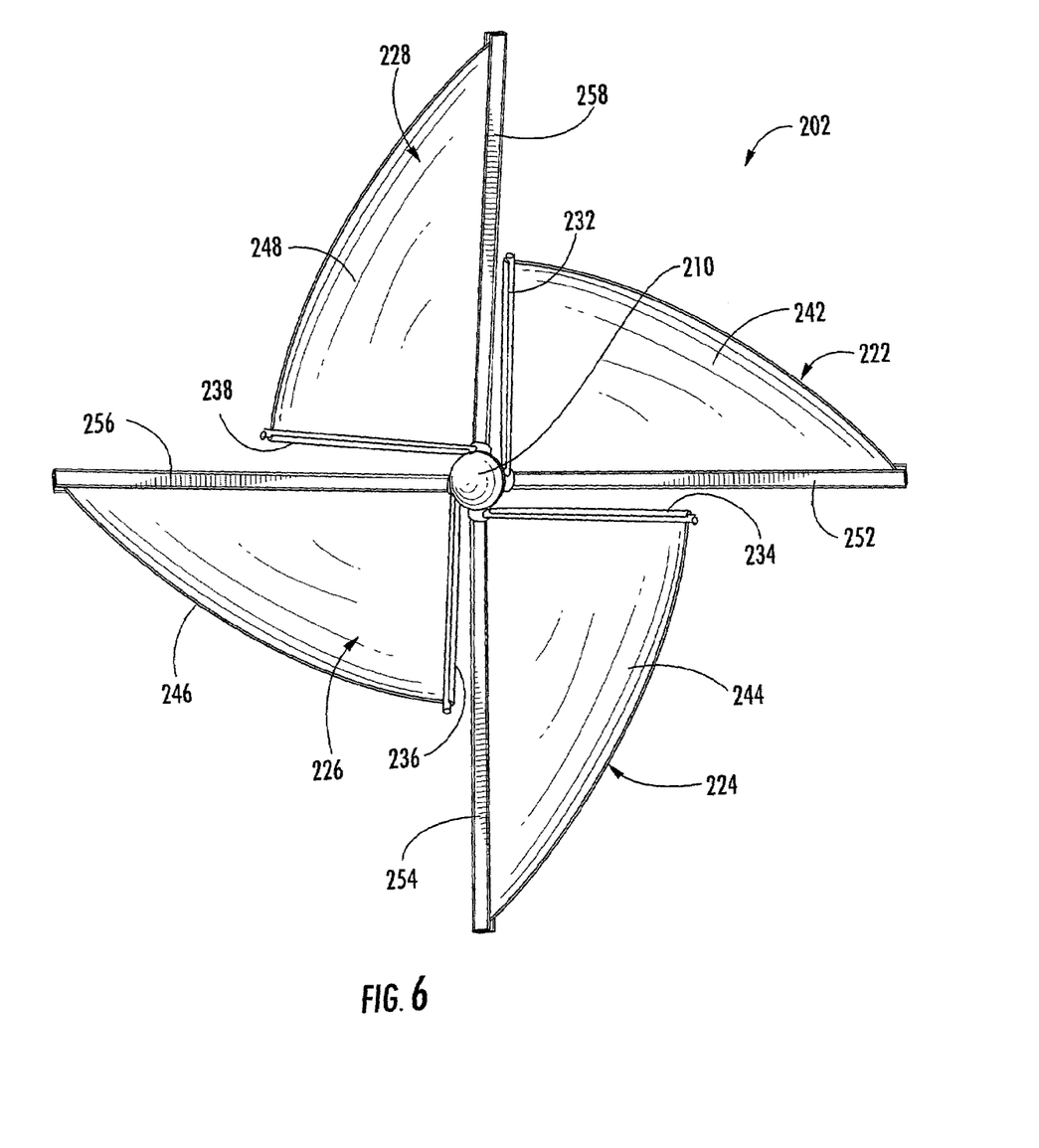
FIG. 6 is a front view of four turbine blades and a hub according to a particular embodiment of the invention.

The hub may be configured to support any appropriate number of turbine blades. For example, the embodiment of the hub 110 shown in FIG. 2A is configured to support three turbine blades 122, 124, 126, and the hub 210 shown in the alternative embodiment of the invention shown in FIG. 6 is configured to support four turbine blades 222, 224, 226, 228. As will be understood by one skilled in the relevant field, other embodiments of the hub may be configured for supporting other numbers of turbine blades (e.g., 1, 2, 5, 6, or more turbine blades).

Also, while a hub according to a preferred embodiment of the invention is configured to support a plurality of structurally separate turbine blades, in an alternative embodiment of the invention, the hub may be configured to support two or more structurally interdependent turbine blades. For example, in the embodiment of the invention shown in FIG. 6, the first and third rotors 252, 256 may be formed of a single length of material that extends through the hub 210. Accordingly, in this embodiment of the invention, the first and third turbine blades 222, 226 are structurally interdependent because they share a common structural element.

The hub 210 may also be configured to support more than one plurality of structurally interdependent turbine blades. For example, in the embodiment shown in FIG. 6: (A) the first and third rotors 252, 256 may be formed of a first single length of material that extends through the hub 210; and (B) the second and fourth rotors 254, 258 may be formed of a second single length of material that extends through the hub 210 (e.g., farther from the base of the hub 210 than the first single length of material). Accordingly, in this embodiment of the invention, the hub 210 is configured to support two pluralities of structurally interdependent turbine blades (e.g., two pluralities of structurally interdependent turbine blades that are offset from one another by about 90 degrees).

Additional Components

In one embodiment of the invention, the wind turbine comprises a central computer that is configured for controlling the configuration of the wind turbine. In a particular embodiment, as mentioned above, the central computer is connected to control the various drive mechanisms that are used to furl/unfurl the wind turbine's various sails.

In a particular embodiment of the invention, the wind turbine also comprises a wind sensor that is configured for sensing the wind speed adjacent the wind turbine and for transmitting this information to the wind turbine's central computer. Alternatively, the wind turbine's central computer may be connected to any other appropriate device (e.g., a Doppler radar device) that is configured for sensing or predicting the weather to which the wind turbine is currently being (or will be) exposed. For example, the wind turbine's central computer may be connected to receive information from a remote weather station via the Internet.

In a particular embodiment of the invention, a central wind sensing device is positioned adjacent a plurality of wind turbines and used to transmit wind speed information to each of the plurality of wind turbines. This serves to reduce the production costs of the wind turbines while providing weather information that is specific to the location of the wind turbines.

II. Operation of the Wind Turbine

As noted above, in one embodiment of the invention, the wind turbine's central computer is preferably configured for receiving information regarding the wind speed (or predicted wind speed) adjacent the wind turbine. In one embodiment of the invention, the wind turbine's central computer continuously monitors this information.

In a particular embodiment of the invention, the central computer uses this wind speed information to identify a preferred current sail configuration for the wind turbine's various sails. For example, in one embodiment, the central computer may determine, based on this information, that the wind turbine's sails should be: (1) completely furled; (2) completely extended; (3) about 40% extended; or (4) about 60% extended. In a particular embodiment, the central computer then moves the sails into the determined preferred sail configuration using the techniques described above. In one embodiment of the invention, the wind turbine repeats this process periodically (e.g., every 5 to 10 minutes) to assure that the wind turbine's configuration stays suited to the current weather conditions.

Typically, it will be desirable to fully extend (or substantially fully extend) the wind turbine's various sails in relatively low-wind conditions in order to maximize the amount of energy transmitted to the wind turbine's drive shaft. Similarly, it will typically be desirable to fully retract (or substantially fully retract) the wind turbine's various sails in high-wind conditions in order to prevent the sails (or other wind turbine components) from being damaged by high winds.

As noted above, in one embodiment of the invention, one or more (and preferably all) of the wind turbine's various sails are configured to be stored substantially entirely (and preferably entirely) within a recess in the wind turbine's corresponding boom in order to further prevent the sail from being damaged by high winds. Alternatively, the sails may be configured to be stored adjacent, but not within (e.g., behind), their corresponding booms.

In another embodiment of the invention, one or more (and preferably all) of the wind turbine's various sails are configured to be stored substantially entirely within a recess in the wind turbine's corresponding rotor in order to further prevent the sail from being damaged by high winds. Alternatively, the sails may be configured to be stored adjacent, but not within (e.g., behind), their corresponding rotors.

III. Assembly and Manufacturing of the Wind Turbine

Wind turbines according to various embodiments of the present invention may be assembled in various different ways. In one embodiment, each wind turbine is assembled at a central manufacturing facility and then transported to a use site, where it is fixedly installed for use (e.g., installed for use for at least six months).

In another embodiment of the invention, the parts required to assemble: (1) the wind turbines and/or (2) the various components of the wind turbine (e.g., the wind turbine's rotors), are shipped to a use site where they are assembled on-site to produce a wind turbine. This may be advantageous because it allows the individual wind turbine components to be shipped in small parts, which can reduce the transportation costs associated with manufacturing and installing the wind turbines.

In yet another embodiment of the invention, one or more of the various wind turbine components are manufactured at the use site. For example, in one embodiment of the invention, the wind turbine's rotors and/or booms are manufactured at the use site using portable manufacturing equipment. More particularly, in a particular embodiment of the invention, the raw materials needed to assemble the wind turbine's rotors and/or booms are first transported to the wind turbine's use site. The wind turbine's rotors and/or booms are then manufactured at the wind turbine's use site via one or more of the following manufacturing techniques: (1) pultrusion techniques; (2) thermoforming techniques; (3) resin infusion techniques; and (4) filament winding techniques.

The wind turbine's booms and rotors may be made in either a single piece, or in segments. For example, a 45 foot boom or rotor having a U-shaped cross section such as the cross section shown in FIG. 5A may be manufactured (e.g., using pultrusion techniques) in either a single 45 foot length, or in a plurality of shorter segments (e.g., three 15 foot segments).

The primary support portion of the wind turbine's booms and rotors may be manufactured in a single piece and then combined with shell components that enhance the aerodynamic shape of the rotor or boom. For example, a rotor having the cross section shown in FIG. 5C may be manufactured by: (1) first using pultrusion techniques to form the rotor's H-shaped primary support portion; (2) using pultrusion techniques to form the rotor's C-shaped shell portion; and then (3) attaching the C-shaped shell portion adjacent the H-shaped base portion to form the final shape shown in FIG. 5C.

In various embodiments of the invention, a filament winding process may be used to produce the primary support portion of the wind turbine's various booms and rotors. In these embodiments, the primary support portion's various components will typically have a round or oblong cross-section. In such embodiments, an aerodynamic external shell is preferably provided to enhance the aerodynamic qualities of the corresponding boom or rotor.

In addition, as noted above, in certain embodiments of the invention, the wind turbine's rotors may be manufactured in sufficient length so that they can extend through the wind turbine's hub and act as the rotor portion of two different turbine blades on opposite sides of the rotor. One such embodiment is shown in FIG. 6. As discussed above, in this embodiment, the first and third rotors 252, 256 may be comprised of a first single length of material, and the second and fourth rotors 254, 258 may be comprised of a second single length of material.

IV. Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A wind turbine comprising:
a support portion;
a hub that is mounted to rotate adjacent said support portion;
at least one turbine blade mounted adjacent said hub, said at least one turbine blade comprising: (A) a rotor, and (B) a sail that is mounted adjacent said rotor, wherein:
said rotor is substantially in the shape of an airfoil,
said sail is mounted to be selectively extended and retracted adjacent said rotor, and
said wind turbine further comprises a furling mechanism that is adapted for selectively extending and retracting said sail adjacent said rotor, said furling mechanism being disposed substantially within said rotor.

2. The wind turbine of claim 1, wherein said furling mechanism is a roller furling mechanism.

3. The wind turbine of claim 1, wherein:
said rotor is substantially planar; and
said furling mechanism is adapted for selectively moving said sail adjacent said rotor by moving said sail substantially within a plane defined by said rotor.

4. The wind turbine of claim 1, wherein said sail is mounted so that at least a portion of said sail is stored adjacent a rear surface of said rotor when said sail is in a retracted position.

5. The wind turbine of claim 1, wherein said sail is mounted so that said sail is stored substantially entirely adjacent a rear surface of said rotor when said sail is in a retracted position.

6. The wind turbine of claim 1, wherein said sail is mounted so that at least a portion of said sail is stored within said rotor when said sail is in a retracted position.

7. The wind turbine of claim 1, wherein said sail is mounted so that said sail is stored substantially entirely within said rotor when said sail is in a retracted position.

8. The wind turbine of claim 1, wherein:
said wind turbine comprises a boom that extends in a substantially fixed position adjacent said rotor; and
said sail is mounted so that at least a portion of said sail extends between said rotor and said boom when said sail is in an extended position.

9. A wind turbine comprising:
a support portion;
a hub that is mounted to rotate adjacent said support portion;
at least one turbine blade mounted adjacent said hub, said at least one turbine blade comprising: (A) a rotor, and (B) a sail that is mounted adjacent said rotor, wherein:
said rotor is substantially in the shape of an airfoil and has a central axis,
said sail is mounted to be selectively extended and retracted adjacent said rotor,
said wind turbine further comprises a furling mechanism that is adapted for selectively extending and retracting said sail adjacent said rotor, and
said furling mechanism is adapted for moving said sail in a direction that is substantially parallel to said central axis.

10. The wind turbine of claim 9, wherein said sail is mounted so that at least a portion of said sail is stored adjacent a rear surface of said rotor when said sail is in a retracted position.

11. The wind turbine of claim 9, wherein said sail is mounted so that said sail is stored substantially entirely adjacent a rear surface of said rotor when said sail is in a retracted position.

12. The wind turbine of claim 9, wherein said sail is mounted so that at least a portion of said sail is stored within said rotor when said sail is in a retracted position.

13. The wind turbine of claim 9, wherein said sail is mounted so that said sail is stored substantially entirely within said rotor when said sail is in a retracted position.

14. The wind turbine of claim 9, wherein:
said wind turbine comprises a boom that extends in a substantially fixed position adjacent said rotor; and
said sail is mounted so that at least a portion of said sail extends between said rotor and said boom when said sail is in an extended position.

15. The wind turbine of claim 9, wherein:
said wind turbine comprises a boom that extends adjacent said rotor; and
said sail is mounted so that: (A) at least a portion of said sail extends between said rotor and said boom when said sail is in an extended position, and (B) at least a portion of said sail is stored within said boom when said sail is in a retracted position.

16. A wind turbine comprising:
a support portion;
a hub that is mounted to rotate adjacent said support portion;
at least one turbine blade mounted adjacent said hub, said at least one turbine blade comprising: (A) a rotor, and (B) a sail that is mounted adjacent said rotor, wherein:
said rotor is substantially in the shape of an airfoil,
said sail is mounted to be selectively extended and retracted adjacent said rotor,
said wind turbine further comprises a boom that extends adjacent said rotor, said boom defining a boom recess,
said sail is mounted so that: (A) at least portion of said sail extends between said rotor and said boom when said sail is in an extended position, and (B) at least a portion of said sail is stored within said boom when said sail is in a retracted position, and
said sail is mounted so that at least a portion of said sail is stored within said boom recess when said sail is in said retracted position.

17. A wind turbine comprising:
a support portion;
a hub that is mounted to rotate adjacent said support portion;
at least one turbine blade mounted adjacent said hub, said at least one turbine blade comprising: (A) a rotor, and (B) a sail that is mounted adjacent said rotor, wherein:
said rotor is substantially in the shape of an airfoil,
said sail is mounted to be selectively extended and retracted adjacent said rotor,
said wind turbine further comprises a boom that extends adjacent said rotor wherein an exterior surface of said boom is substantially in the shape of an airfoil, and
said sail is mounted so that: (A) at least portion of said sail extends between said rotor and said boom when said sail is in an extended position, and (B) at least a portion of said sail is stored within said boom when said sail is in a retracted position.

18. A wind turbine comprising:
a support portion;
a hub that is mounted to rotate adjacent said support portion;
at least one turbine blade mounted adjacent said hub, said at least one turbine blade comprising: (A) a rotor, and (B) a sail that is mounted adjacent said rotor, wherein:
said rotor is substantially in the shape of an airfoil and is comprised of a plurality of attached mast segments, each of said mast segments being at least 15 feet in length, and
said sail is mounted to be selectively extended and retracted adjacent said rotor.

19. The wind turbine of claim 18, wherein said rotor is comprised of at least three of said attached mast segments.

20. The wind turbine of claim 18, wherein each of said attached mast segments comprises a primary support portion that has been formed using pultrusion techniques.

21. The wind turbine of claim 18, wherein each of said attached mast segments comprises a primary support portion that has been formed using filament winding techniques.

22. The wind turbine of claim 18, wherein each of said attached mast segments comprises a primary support portion that has been formed using a resin infusion techniques.

23. The wind turbine of claim 18, wherein each of said attached mast segments comprises a primary support portion that has been formed using thermoforming techniques.

* * * * *